United States Patent
Endo et al.

(10) Patent No.: US 8,977,436 B2
(45) Date of Patent: Mar. 10, 2015

(54) ELECTRIC POWER STEERING SYSTEM

(75) Inventors: Masaya Endo, Tokyo (JP); Takashi Iwasaki, Tokyo (JP); Masahiko Kurishige, Tokyo (JP); Takayuki Kifuku, Tokyo (JP); Yoshihiko Kinpara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/811,849

(22) PCT Filed: Jul. 13, 2011

(86) PCT No.: PCT/JP2011/004009
§ 371 (c)(1),
(2), (4) Date: Jan. 25, 2013

(87) PCT Pub. No.: WO2012/014399
PCT Pub. Date: Feb. 2, 2012

(65) Prior Publication Data
US 2013/0124049 A1 May 16, 2013

(30) Foreign Application Priority Data
Jul. 27, 2010 (JP) ................. 2010-168201

(51) Int. Cl.
*B62D 5/04* (2006.01)
*B62D 6/00* (2006.01)

(52) U.S. Cl.
CPC .............. *B62D 5/046* (2013.01); *B62D 5/0463* (2013.01); *B62D 6/008* (2013.01)
USPC ....................................... 701/42

(58) Field of Classification Search
USPC ............ 701/36, 41, 42; 180/6.28, 6.44, 6.48, 180/6.5, 78, 443–444, 447
See application file for complete search history.

(56) References Cited

U.S. PATENT DOCUMENTS

| | | | | |
|---|---|---|---|---|
| 6,795,762 | B2* | 9/2004 | Itoh et al. ................. | 701/43 |
| 6,983,818 | B2* | 1/2006 | Fujioka et al. ............. | 180/446 |
| 7,275,617 | B2* | 10/2007 | Endo et al. ................ | 180/402 |
| 8,234,041 | B2* | 7/2012 | Fujii et al. ................ | 701/41 |

(Continued)

FOREIGN PATENT DOCUMENTS

| | | |
|---|---|---|
| JP | 9 156518 | 6/1997 |
| JP | 2002 67997 | 3/2002 |

(Continued)

OTHER PUBLICATIONS

International Search Report Issued Sep. 20, 2011 in PCT/JP11/004009 Filed Jul. 13, 2011.

*Primary Examiner* — Mary Cheung
*Assistant Examiner* — Rodney Butler
(74) *Attorney, Agent, or Firm* — Oblon, McClelland, Maier & Neustadt, L.L.P.

(57) ABSTRACT

An electric power steering system includes steering a torque detector that detects steering torque, and a motor that provides assist torque based on the detected steering torque, wherein for the purpose of estimating, without detecting motor rotation angular information and rotation angular velocity information, the road reaction torque in which the influence of the motor inertia torque is eliminated, a value corresponding to rotation velocity of a steering shaft is calculated based on the steering torque and the assist torque, to calculate road reaction torque based on the value corresponding to the rotation velocity of the steering shaft.

18 Claims, 15 Drawing Sheets

(56) References Cited

U.S. PATENT DOCUMENTS

| | | | |
|---|---|---|---|
| 2002/0026270 A1* | 2/2002 | Kurishige et al. | 701/41 |
| 2008/0189014 A1* | 8/2008 | Tanaka et al. | 701/42 |
| 2009/0266641 A1* | 10/2009 | Ehara et al. | 180/446 |
| 2010/0168963 A1 | 7/2010 | Yamamoto | |
| 2011/0098887 A1* | 4/2011 | Fujimoto | 701/41 |

FOREIGN PATENT DOCUMENTS

| | | | |
|---|---|---|---|
| JP | 2002 369565 | | 12/2002 |
| JP | 2003285752 A | * | 10/2003 |
| JP | 2003 312521 | | 11/2003 |
| JP | 2005007992 A | * | 1/2005 |
| JP | 2007 69855 | | 3/2007 |
| JP | 2007 168756 | | 7/2007 |
| JP | 2008 151762 | | 7/2008 |
| JP | 2009 62036 | | 3/2009 |
| JP | 2009051308 A | * | 3/2009 |
| JP | 2010 83313 | | 4/2010 |
| WO | 2007 129573 | | 11/2007 |

* cited by examiner

ELECTRIC POWER STEERING SYSTEM

TECHNICAL FIELD

The present invention relates to an electric power steering system that assists steering using a motor.

BACKGROUND ART

A technique for estimating road reaction torque, acting on a steering shaft, from motor voltage, motor current and steering torque, is proposed for conventional electric power steering systems (Patent Document 1, for instance).

Another electric power steering system is proposed which determines whether there is an increased steering angle and estimates, during the increased steering angle, rack thrust that is in a proportional relationship with the road reaction torque, from the motor current and the steering torque (Patent Document 2, for instance).

RELATED ART DOCUMENT

Patent Document

[Patent Document 1] Japanese Unexamined Patent Application Publication No. H09-156518 (page 2, and FIG. 8)
[Patent Document 2] Japanese Unexamined Patent Application Publication No. 2010-83313 (page 2, and FIG. 3)

SUMMARY OF THE INVENTION

The Problem that the Invention is to Solve

In such an electric power steering system, when a driver steers a vehicle at a high steering frequency, motor inertia torque increases thereby influencing an estimation accuracy of road reaction torque; thus, in Patent Document 1, for instance, the motor inertia torque is estimated by mathematically differentiating motor angular velocity estimated from motor voltage, and the road reaction torque is estimated using the estimated motor inertia torque. However, a problem has been that the motor voltage contains noise and accordingly the mathematical differentiation increases the influence of noise, thus not allowing accurate estimation of the road reaction torque. Another problem has been that when the motor voltage is low-pass filtered in order to eliminate the noise, the road reaction torque cannot accurately be estimated for a steering pattern that contains much high steering frequency content, such as sharp steering, because a phase lag occurs resulting from the low-pass filtering of the motor voltage.

Further, when, as shown in Patent Document 2, the accuracy of estimation of rack thrust is increased by limiting the estimation to the time when there is the increased steering angle, a disadvantage is created in that the rack thrust cannot be estimated during the time when the steering wheel is being returned to its normal position. In addition to that, a problem remains in that the motor inertia torque influences the estimation at a high steering frequency and thus the estimation accuracy is reduced.

The present invention is directed to overcome the foregoing problems, and an object of the invention is to provide an electrical power steering system that enables an accurate estimation of road reaction torque even when steering is performed in a steering pattern that contains much high steering frequency content, such as sharp steering.

Means for Solving the Problems

An electric power steering system according to the present invention comprises steering torque detection means that detects steering torque, and a motor that provides assist torque based on the detected steering torque, wherein a value corresponding to rotation velocity of a steering shaft is calculated based on the steering torque and the assist torque, to calculate road reaction torque based on the value corresponding to the rotation velocity of the steering shaft.

Advantageous Effects of the Invention

According to the present invention, a value corresponding to rotation velocity of a steering shaft is calculated based on steering torque and assist torque, and based on the value corresponding thereto, road reaction torque is calculated, and thereby the influence of motor inertia torque can be calculated without using motor voltage. As a result, noise of the motor voltage does not influence the system, and a nonconventional, significant advantageous effect is achieved such that road reaction torque can be estimated even when steering is performed in a steering pattern that contains much high steering frequency content, such as sharp steering.

MODES FOR CARRYING OUT THE INVENTION

Embodiment 1

Figure 1:
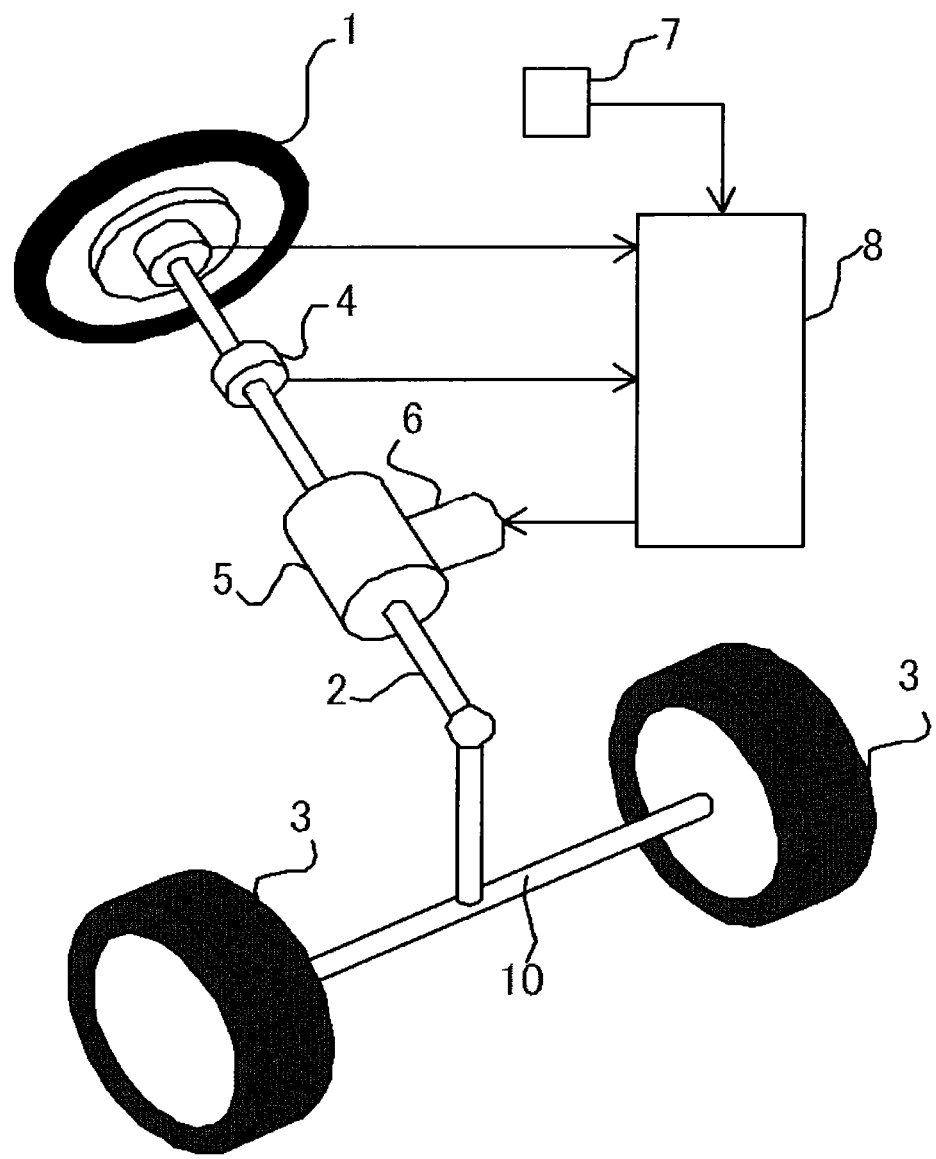
FIG. 1 is a diagrammatic view illustrating a configuration of an electric power steering system according to Embodiment 1 of the present invention.

FIG. 1 is a diagrammatic view illustrating a configuration of an electric power steering system according to Embodiment 1 of the present invention. A driver steers a steering wheel 1. The steering wheel 1 is connected via a steering shaft 2 and a rack 10 to steerable road wheels 3, the steerable road wheels 3 being steered according to rotation angles of the steering wheel 1. Disposed between the steering wheel 1 and the steerable road wheels 3 is a steering torque sensor 4 that detects steering torque acting on a portion of the steering shaft 2 toward the steering wheel 1 from a motor 6. In addition, the motor 6 is connected via a decelerator 5 to the steering shaft 2; a sum of assist torque—which is torque generated by the motor 6 and amplified via the decelerator 5—and the steering torque, causes the steering shaft 2 and the steerable road wheels 3 to rotate against road reaction torque that is transmitted from the steerable road wheels 3 to the steering shaft 2. Vehicle travel speed is detected by a vehicle speed sensor 7. A control unit 8 includes a current sensor 87 that detects current flowing through the motor 6, and also calculates command current needing to generate the torque of the motor 6, on the basis of a steering torque signal detected with the steering torque sensor 4 and a vehicle speed signal detected with the vehicle speed sensor 7; the control unit provides current control so that a motor current signal detected with the current sensor 87 agrees with the command current, and provides the corresponding applied voltage to the motor 6.

Figure 2:
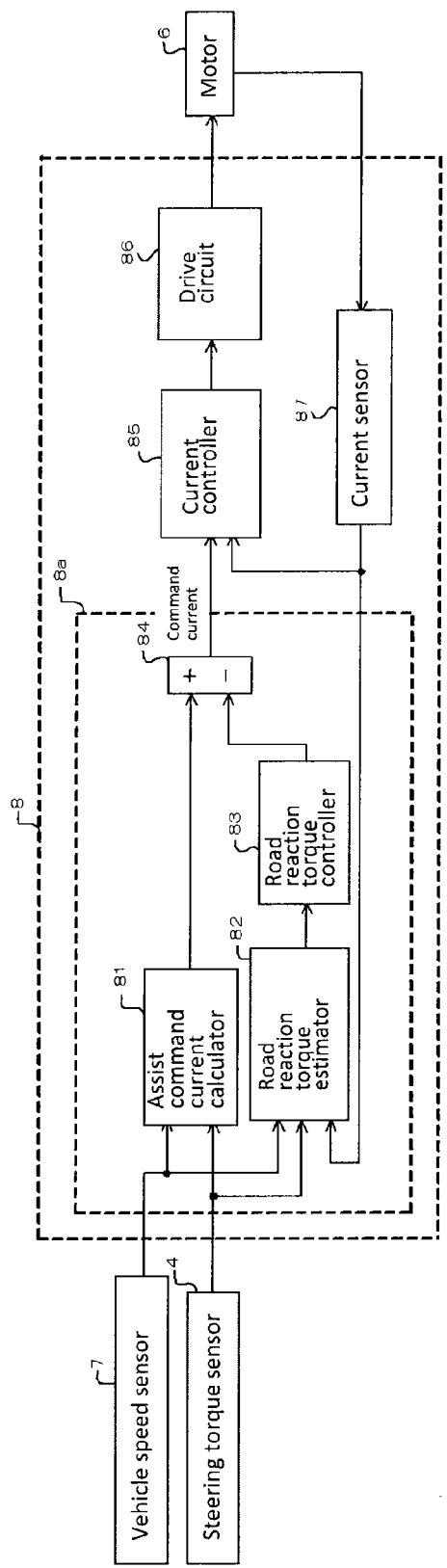
FIG. 2 is a block diagram illustrating a control unit 8 according to Embodiment 1 of the present invention.

FIG. 2 is a block diagram illustrating a configuration of the control unit 8. A command current calculator 8a calculates command current for commanding current that flows through the motor 6. The command current calculator 8a includes an assist command current calculator 81, a road reaction torque estimator 82, a road reaction torque controller 83, and a subtractor 84.

The assist command current calculator 81 calculates assist command current for reducing driver's steering torque, based on the steering torque detected with the steering torque sensor 4 and the vehicle speed detected with the vehicle speed sensor 7.

Figure 5:
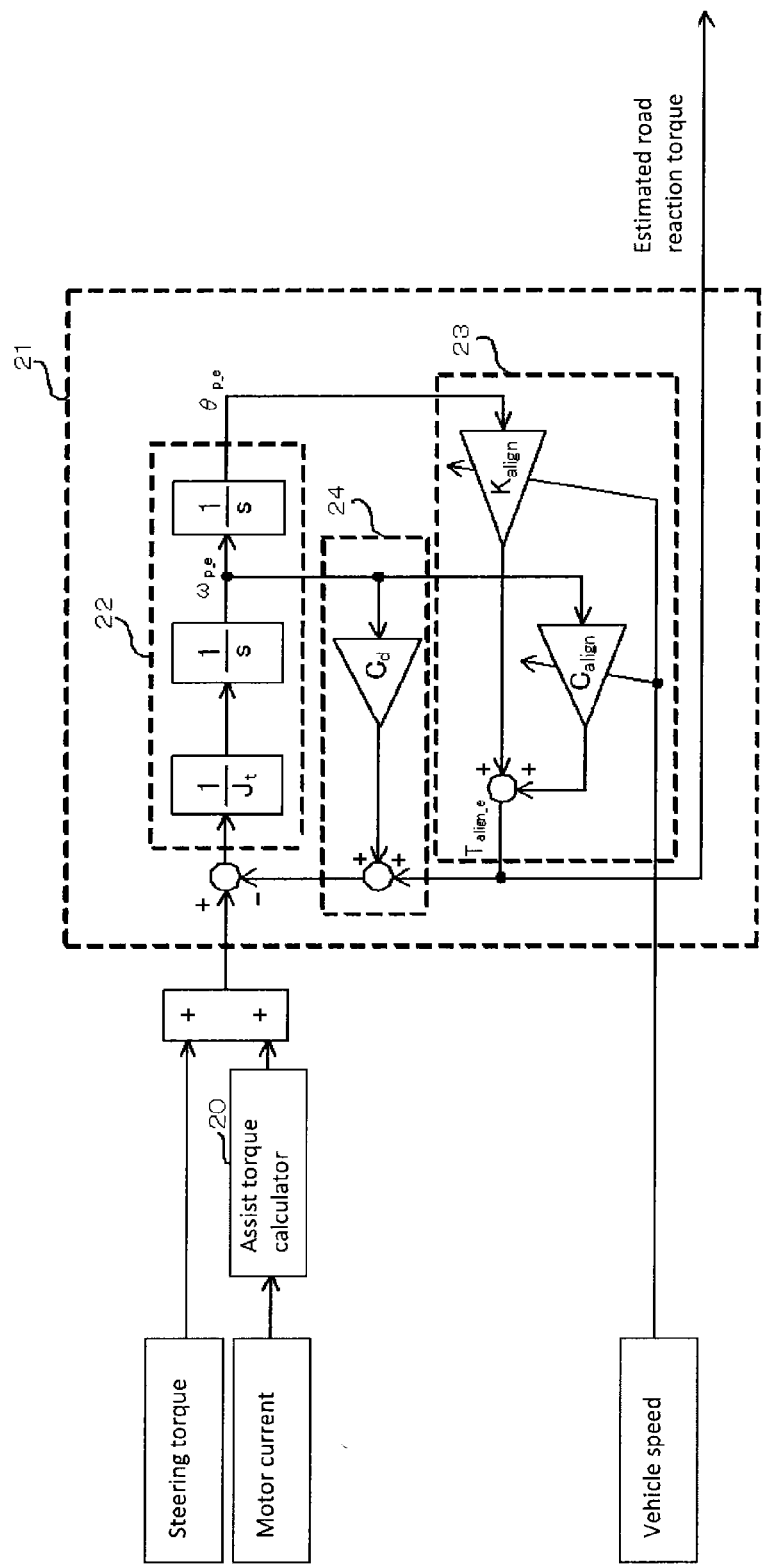
FIG. 5 is a block diagram illustrating an operation of a road reaction torque estimator 82 according to Embodiment 1 of the present invention.

The road reaction estimator 82 receives the steering torque signal, the motor current signal, and the vehicle speed signal, to estimate the road reaction torque using a dynamic model calculator 21 in FIG. 5. The road reaction torque controller 83 calculates reaction command current from the estimated road reaction torque calculated with the road reaction estimator 82.

The subtractor 84 is a corrector that subtracts the reaction command current from the assist command current to thereby correct the assist torque, and the result is assigned as command current for the motor 7. The road reaction torque controller 83 has a functional effect to reduce the assist torque according to the estimated road reaction torque, and accordingly, the road feel experienced by the driver can appropriately be increased in terms of a vehicle having insufficient road reaction torque generated when the steering wheel is steered.

From the motor current signal detected with the current sensor 87 and the command current, the current controller 85 calculates applied voltage to the motor so that the command current agrees with current flowing through the motor 6. A drive circuit 86 provides PWM drive to the motor so that the foregoing applied voltage is supplied to the motor.

Figure 3:
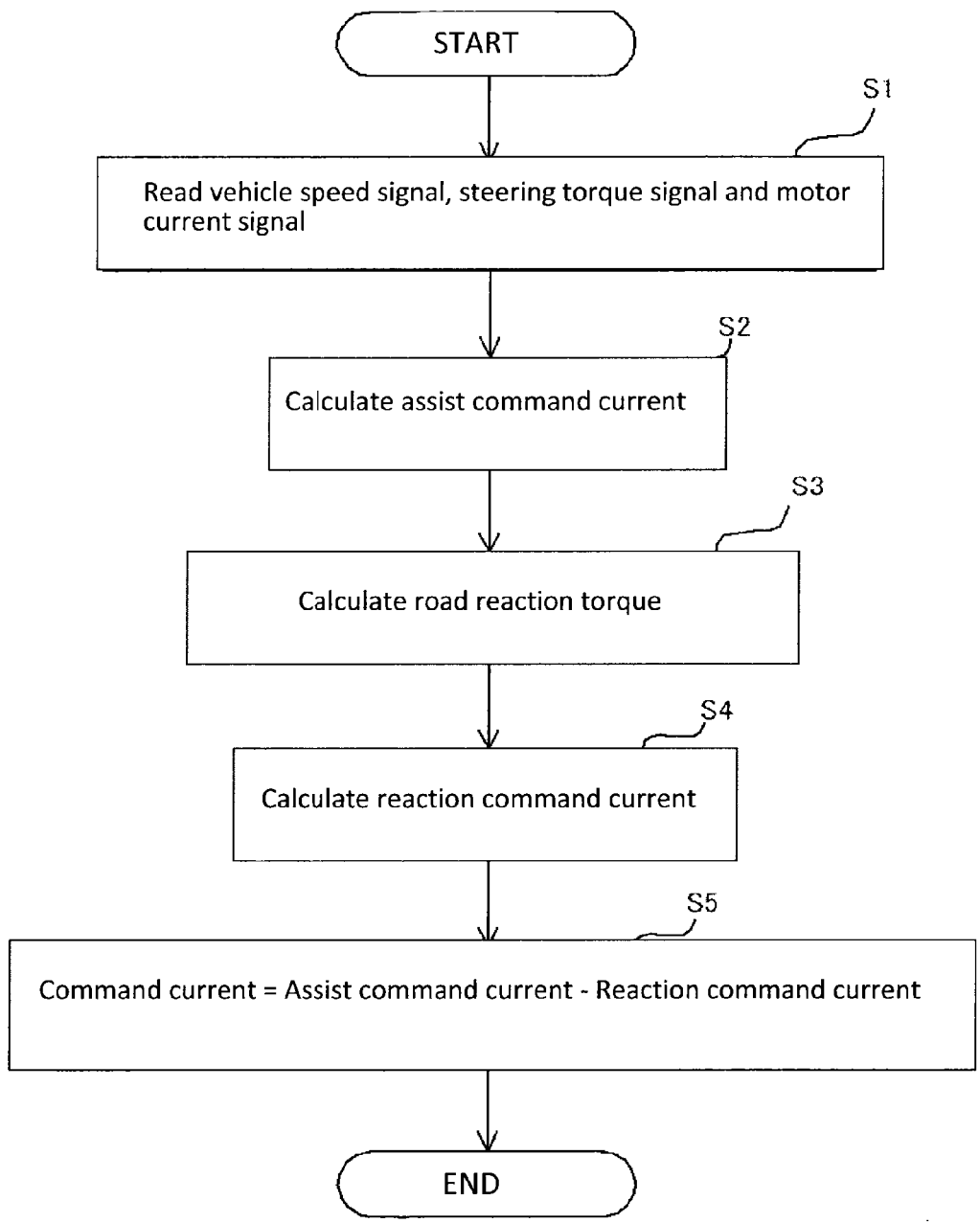
FIG. 3 is a flow diagram of a command current calculator 8a according to Embodiment 1 of the present invention.

Operation of the command current calculator 8a, which is the chief part of the invention, will be next described with reference to the flow diagram of FIG. 3.

Figure 4:
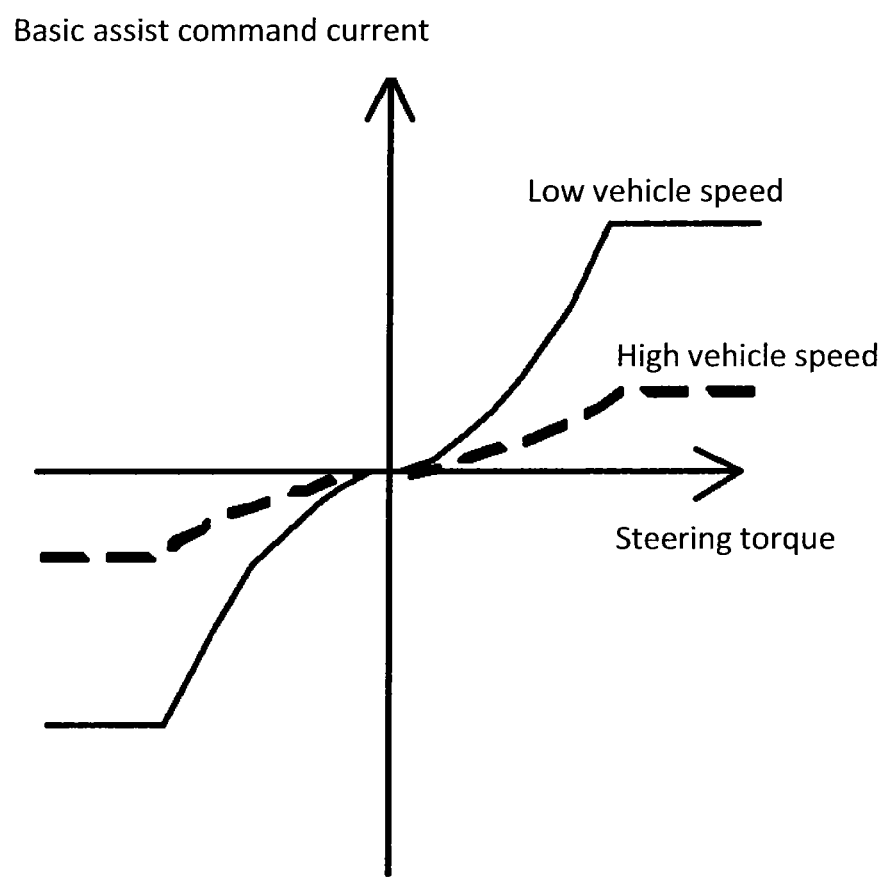
FIG. 4 is an assist map according to Embodiment 1 of the present invention.

In step S1, the vehicle speed signal measured with the vehicle speed sensor 7, the steering torque signal measured with the steering torque sensor 4, and the motor current signal measured with the current sensor 87, are read from a memory. A value of the assist command current with respect to the vehicle speed and the steering torque, is pre-stored in the memory, as in an assist map shown in FIG. 4, and in step S2, in the assist command current calculator 81, the assist command current is determined from the vehicle speed and the steering torque. In step S3, the road reaction torque estimator 82 estimates the road reaction torque from the vehicle speed, the steering torque, and the motor current. Operation of the road reaction torque estimator 82 will be described with reference to the block diagram shown in FIG. 5.

The block diagram of FIG. 5 is based on a motion equation for the steering shaft 2. A rotational motion equation for the steering shaft 2 located between the steering torque sensor 4 and the steerable road wheels 3 is given by Equation 1. Note that the present embodiment is directed to an electric power steering system that utilizes a steering mechanism using a device such as a magnetic gear or a magnetic bearing and thereby having an extremely little amount of Coulomb friction.

$$J_t(d\omega_p/dt) = T_{sens} + T_{assist} - C_d\omega_p - T_{align} \qquad \text{(Equation 1)}$$

Here, symbols used in relational equations have the following meanings:

SYMBOL $J_t$ Moment of inertia of steering shaft 2 [kgm$^2$]
$\omega_p$ Rotation angular velocity of steering shaft 2 [rad/s]
$T_{sens}$ Steering torque sensor signal [Nm]
$T_{assist}$ Assist torque [Nm]
$C_d$ Viscosity coefficient of steering shaft 2 [Nm/(rad/s)]
$T_{align}$ Road reaction torque [Nm]
$J_m$ Moment of inertia of motor 6 [kgm$^2$]
n Deceleration ratio of decelerator 5
$\theta_p$ Rotation angle of steering shaft 2 [rad]
$\theta_m$ Rotation angle of motor 6 [rad]
$I_m$ Motor current [A]
$K_t$ Motor torque coefficient [Nm/A]
$K_{align}$ Proportional gain of road reaction torque with respect to rotation angle of steering shaft 2 [Nm/rad]
$C_{align}$ Derivative gain of road reaction torque with respect to rotation angle of steering shaft 2 [Nm/(rad/s)]
$T_{fric}$ Amplitude of Coulomb friction in terms of steering shaft 2 [Nm]

In Equation 1, $C_d\omega_p$, represents the viscous friction acting on the steering shaft 2, and $T_{align}$ represents the road reaction torque. The right side of Equation 1 represents the sum of the torque acting on the steering shaft 2.

Since the moment of inertia $J_t$ of the steering shaft 2 chiefly includes the moment of inertia of the motor, it can be calculated by Equation 2. However, the method of calculating the moment of inertia $J_t$ of the steering shaft 2 is not limited to such, but may use moment of inertia of the steerable road wheels, the steering shaft 2 or the decelerator 5.

$$J_t = n^2 J_m \qquad \text{(Equation 2)}$$

The relationship given by Equation 3 is established between the rotation angles of the steering shaft 2 and the motor 6. Symbol $d\omega_p/dt$ denotes differentiation of rotation velocity of the steering shaft, representing rotation angular acceleration of the steering shaft. Further, there is a relationship given by Equation 4 between the rotation angular velocity $\omega_p$ of the steering shaft 2 and the rotation angle $\theta_p$ of the steering shaft 2.

$$\theta_p = \theta_m/n \qquad \text{(Equation 3)}$$

$$\omega_p = d\theta_p/dt \qquad \text{(Equation 4)}$$

As shown in Equation 5, the assist torque calculator 20 of FIG. 5 multiplies the motor current by a torque coefficient and a deceleration ratio, to calculate the assist torque $T_{assist}$ that is provided by the motor to the steering shaft 2.

$$T_{assist} = n K_t I_m \quad \text{(Equation 5)}$$

Based on the equation for the rotational motion of the steering shaft 2, shown in Equation 1, the dynamic model calculator 21 of FIG. 5 calculates the road reaction torque in accordance with the dynamic model that predetermines a transfer characteristic of the steering shaft so that the steering torque and the assist torque serve as inputs and the road reaction torque according to the input serves as an output. The dynamic model calculator 21 includes a steering shaft dynamic model calculator 22, a vehicle model calculator 23 and a friction model calculator 24. The steering shaft dynamic model calculator 22 calculates, from the sum of torque acting on the steering shaft, the estimated value $\omega_{p\_e}$ of the rotation angular velocity of the steering shaft, and the estimated value $\theta_{p\_e}$ of the rotation angular velocity of the steering shaft.

The vehicle model calculator 23 is made up of a dynamic model that pre-determines a transfer characteristic from the rotation angle of the steering shaft to the road reaction torque, and in the present embodiment, the dynamic model is expressed by a transfer function of Equation 6, where s is the Laplace operator.

$$T_{align} = (K_{align} + C_{align} s) \theta_p \quad \text{(Equation 6)}$$

The vehicle model calculator 23 calculates the estimated value $T_{align\_e}$ of road reaction torque, as shown by Equation 7, using the estimated value $\omega_{p\_e}$ of the rotation angular velocity of the steering shaft, and the estimated value $\theta_{p\_e}$ of the rotation angular velocity of the steering shaft.

$$T_{align\_e} = K_{align} \theta_{p\_e} + C_{align} \omega_{p\_e} \quad \text{(Equation 7)}$$

$K_{align}$ and $C_{align}$ vary with the vehicle speed. Accordingly, when the vehicle travels at a constant speed, $K_{align}$ and $C_{align}$ can be set to fixed values; however, when the vehicle travels at different speeds, values of $K_{align}$ and $C_{align}$ corresponding to various vehicle speeds are pre-stored in a memory, and the values of $K_{align}$ and $C_{align}$ are determined using the vehicle speed read from the memory.

The friction model calculator 24 calculates the viscous friction of the steering shaft 2 by multiplying the estimated value $\omega_{p\_e}$ of the rotation angular velocity of the steering shaft by the viscosity coefficient $C_d$ of the steering shaft 2. By subtracting, from the sum of the steering torque and the assist torque, the road reaction torque calculated with the vehicle model calculator 23 and the viscosity friction calculated with the friction model calculator 24, the sum of torque acting on the steering shaft 2 is calculated.

In step S4, the road reaction torque controller 83 multiplies the estimated road reaction torque value $T_{align\_e}$ by the road reaction torque control gain $K_{fb}$, to calculate reaction command current. In step S5, the subtractor 84 subtracts the reaction command current from the assist command current, to calculate command current needing to generate torque of the motor 6.

With the above configuration, the road reaction torque in which the influence of the motor inertia torque is eliminated can be estimated without detecting the motor rotation angular information and the rotation angular velocity information. For that reason, the motor inertia torque does not need to be calculated from the motor voltage, so that the road reaction torque can accurately be estimated even when steering is performed in a steering pattern that contains much high frequency content, such as sharp steering, and in which the moment of inertia increases. When sinusoidal steering is performed at a steering frequency of, for instance, 2 Hz or greater, the influence on the motor inertia torque increases; however, the road reaction torque can accurately be estimated even when such steering is performed.

Further, even at high steering frequencies, the road reaction torque controller 83 enables the road feel according to the road reaction torque to be imparted to the driver, thus providing a more natural road feel as compared with the conventional system.

Note that the vehicle model is not limited to that by Equation 6; a vehicle model may be used that considers, for instance, pitching and rolling movements of the vehicle. In addition, Equation 6 represents a first-order transfer function; however, using a second-order transfer function, a vehicle model having a frequency characteristic closer to that of the vehicle may be used. The use of the vehicle model having a highly accurate frequency characteristic of the vehicle can further increase the estimation accuracy of the road reaction torque.

In addition, based on the steering torque detected with the steering torque sensor 4 and on the vehicle speed detected with the vehicle sensor 7, the assist command current calculator 81 is designed to calculate the assist command current that reduces the driver's steering torque; however, the assist command current may be calculated using another method that is known in the art of electric power steering systems. For instance, viscous command current proportional to the motor rotation angular velocity may be calculated and the value obtained by subtracting the viscous command current from the above assist command current may be assigned as new assist command current.

In addition, the assist torque may be calculated from the command current. When the viscous friction of the steering shaft 2 is minute, the friction model calculator 24 is not provided, which reduces the calculation load.

Further, the system according to the present embodiment is configured to calculate the rotation angular velocity using the rotation angular velocity of the steering shaft as a value corresponding to the rotation speed of the steering shaft; however, the system may be configured to calculate another value corresponding to the rotation speed of the steering shaft, such as the rotation angular velocity of the motor, the steering angular velocity of the steerable road wheels, or the speed of the rack 10.

Embodiment 2

Embodiment 1 is directed to the electric power steering system that uses the steering mechanism having an extremely little amount of the Coulomb friction acting on the steering shaft 2; however, the present embodiment is directed to a typical electric power steering system in which there exists Coulomb friction acting on the steering shaft 2. Of the components in the present embodiment, components that are common to those in Embodiment 1 described above are designated by the same names, reference numerals and symbols. The differences will be chiefly described below.

Figure 6:
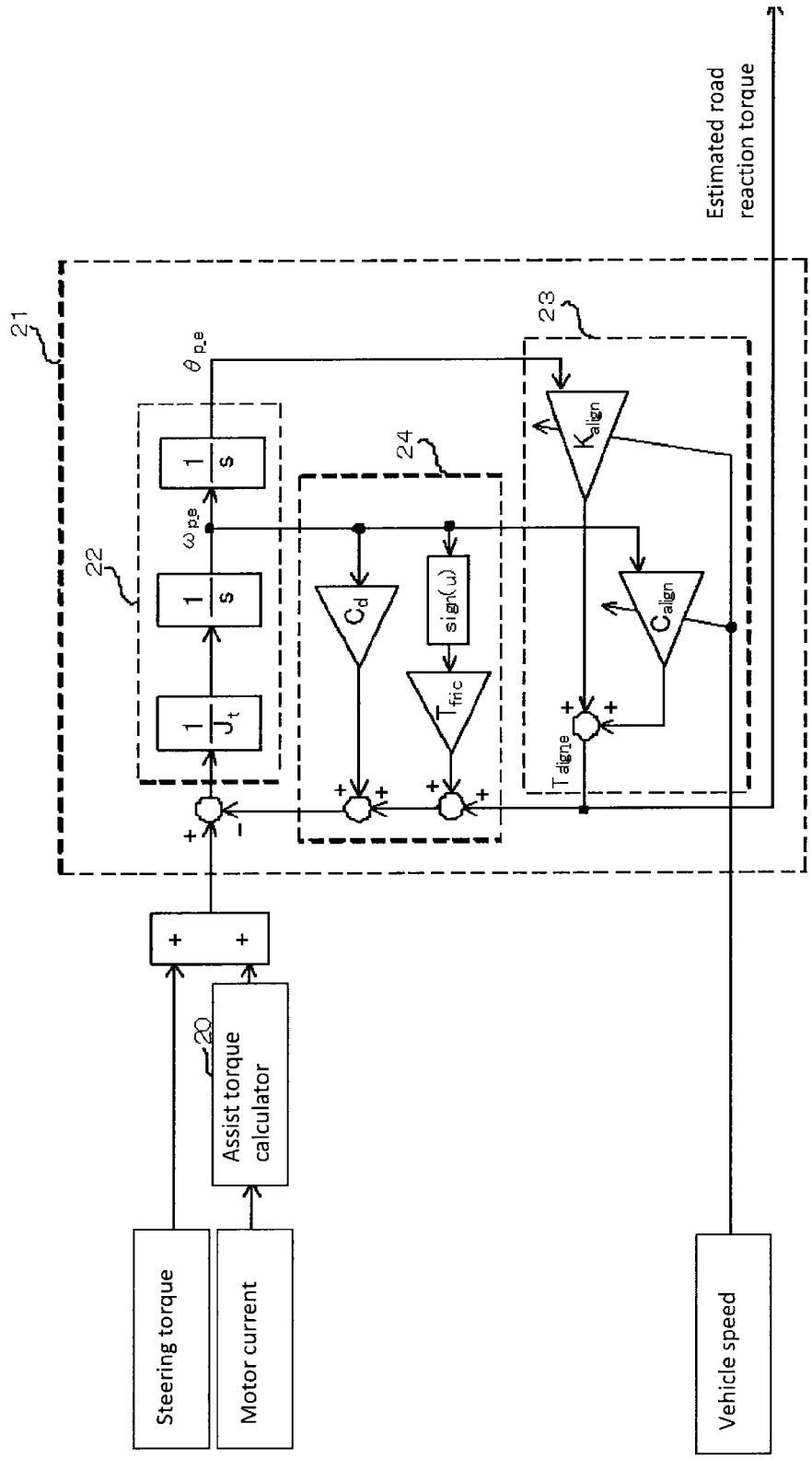
FIG. 6 is a block diagram illustrating an operation of a road reaction torque estimator 82 according to Embodiment 2 of the present invention.

The present embodiment is different from Embodiment 1 in the configuration of the road reaction torque estimator 82 of the control unit 8—shown in the block diagram of FIG. 2. Operation of the road reaction torque estimator 82 will be described with reference to the block diagram shown in FIG. 6.

A rotational motion equation for the steering shaft 2 between the steering torque sensor 4 and the steerable road wheels 3 is given in Equation 8. Coulomb friction can be expressed by the product of the sign of the rotation angular velocity, $\omega_p$, of the steering shaft 2 and the amplitude of Coulomb friction, $T_{fric}$, and acts in the direction against the rotation of the steering shaft 2. The right side of Equation 8 represents the sum of torque acting on the steering shaft 2.

$$J_t(d\omega_p/dt) = T_{sens} + T_{assist} - C_d\omega_p - T_{align} - T_{fric}\operatorname{sign}(\omega_p) \quad \text{(Equation 8)}$$

Based on Equation 8, the friction model calculator 24 of the road reaction estimator 82 includes a new Coulomb friction model in which the rotation angular velocity of the steering shaft is received as an input, to calculate Coulomb friction of the steering shaft, and the result of calculation is generated as an output.

An advantageous effect resulting from the configuration in the present embodiment will be shown in comparison with the conventional electric power steering system. When directed to a typical electric power steering system in which there exists the Coulomb friction acting on the steering shaft 2, Patent Document 1 describes the electric power steering system in which Coulomb friction acting on a steering shaft is minute and thereby assumed to be negligible; therefore, in the road reaction estimation means, the influence of the Coulomb friction is not eliminated. For this reason, the output from the road reaction estimation means results in a sum of the road reaction torque and the Coulomb friction, and thus, accuracy of estimation of the road reaction torque is reduced by the Coulomb friction.

The configuration according to the present embodiment allows accurate estimation of road reaction torque in which influences of the motor inertia torque and the Coulomb friction are eliminated without detecting motor rotation angular information and rotation angular velocity information, even when the Coulomb friction acts on the steering shaft 2. Further, even when steering is performed in the pattern that contains much high steering frequency content, such as sharp steering, the road reaction torque can be estimated accurately.

Figure 7:
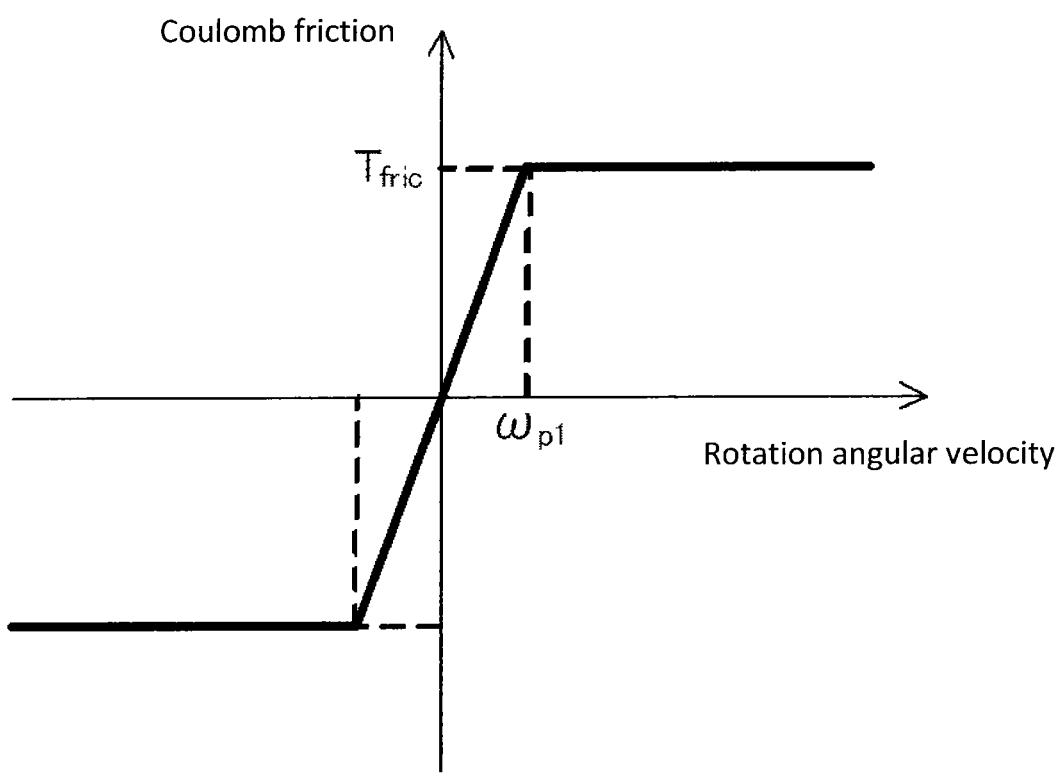
FIG. 7 is an example of a Coulomb friction model according to Embodiment 2 of the present invention.

Note that a model—in which the Coulomb friction is varied with respect to the rotation angular velocity of the steering shaft 2 at a given rate at the rotation angular velocity $\omega_{p1}$ of the steering shaft 2 or smaller, as shown in FIG. 7—may be used as the Coulomb friction model. The rate of change is equivalent to the viscous friction coefficient, and an advantageous effect is created in that the viscous friction in the dynamic model is increased at the rotation angular velocity $\omega_{p1}$ or smaller. This can prevent Coulomb friction variations due to bit variation of the estimated value $\omega_{p\_e}$ of rotation angular velocity of the steering shaft 2, thereby improving accuracy of estimating the estimated road reaction torque.

Embodiment 3

Figure 8:
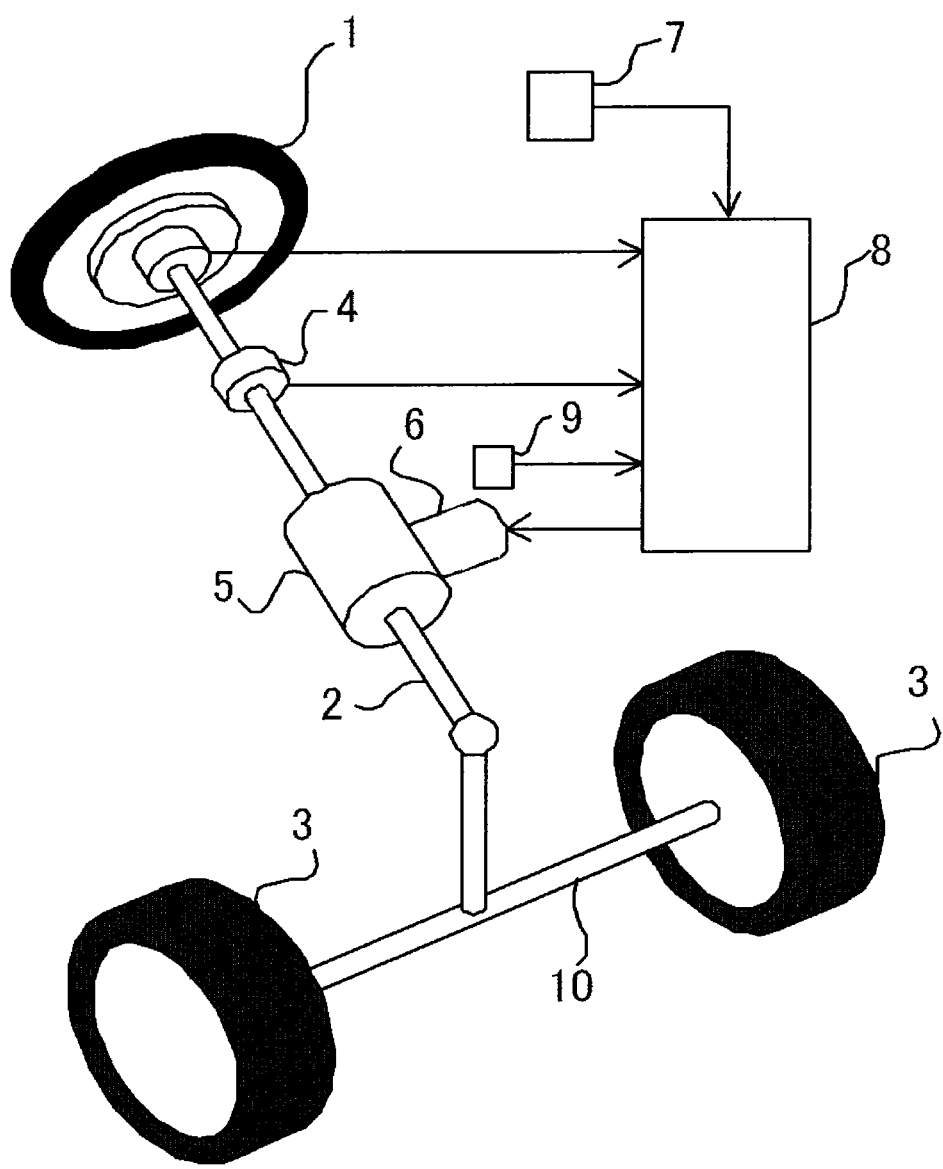
FIG. 8 is a diagrammatic view illustrating a configuration of an electric power steering system according to Embodiment 3 of the present invention.

As is the case with Embodiment 2, the present embodiment is directed to the typical electric power steering system in which there exists the Coulomb friction acting on the steering shaft 2. Of the components in the present embodiment, components that are common to those in the above described embodiments are designated by the same names, reference numerals and symbols. The differences will be chiefly described. FIG. 8 is a diagrammatic view illustrating a configuration of an electric power steering system according to Embodiment 3 of the present invention. The system according to Embodiment 3 includes a rotation angular velocity sensor 9 that detects rotation angular velocity of the steering shaft 2, as shown in FIG. 8.

Figure 9:
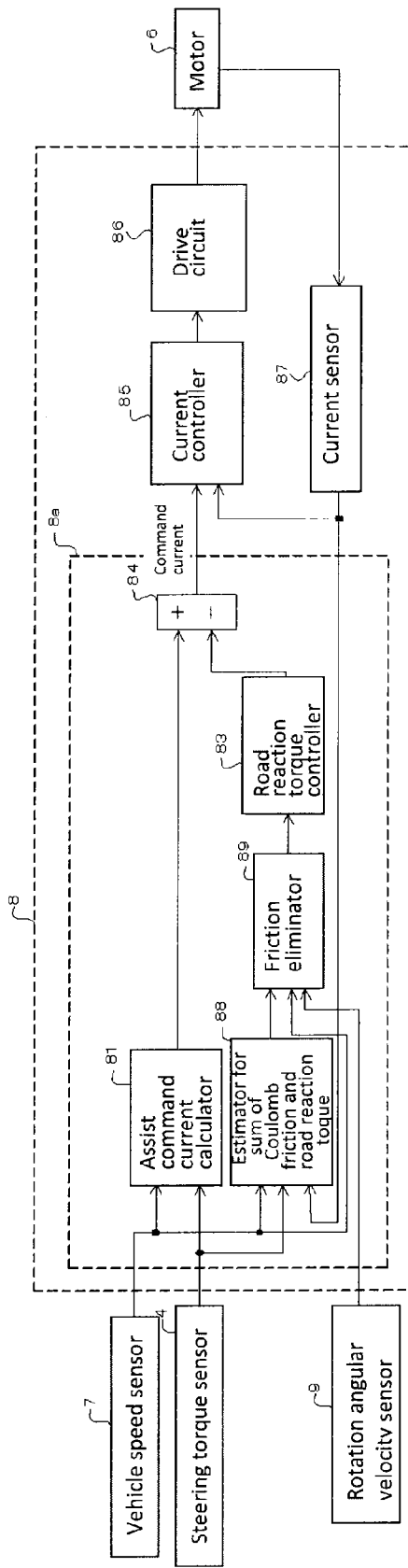
FIG. 9 is a block diagram illustrating a control unit 8 according to Embodiment 3 of the present invention.

FIG. 9 shows the block diagram of the control unit 8 illustrated in FIG. 8. An estimator for the sum of the Coulomb friction and the road reaction torque, designated by 88, reads a steering torque signal, a motor current signal, and a vehicle speed signal, to estimate the sum of the Coulomb friction and the road reaction torque using the dynamic model calculator 21. A friction eliminator 89 calculates road reaction torque that is obtained by eliminating the Coulomb friction, from a rotation angular velocity signal of the steering shaft 2—detected with the rotation angular velocity sensor 9—the vehicle speed and the sum of the Coulomb friction and the road reaction torque calculated with the Coulomb friction and road reaction torque sum estimator 88.

Figure 10:
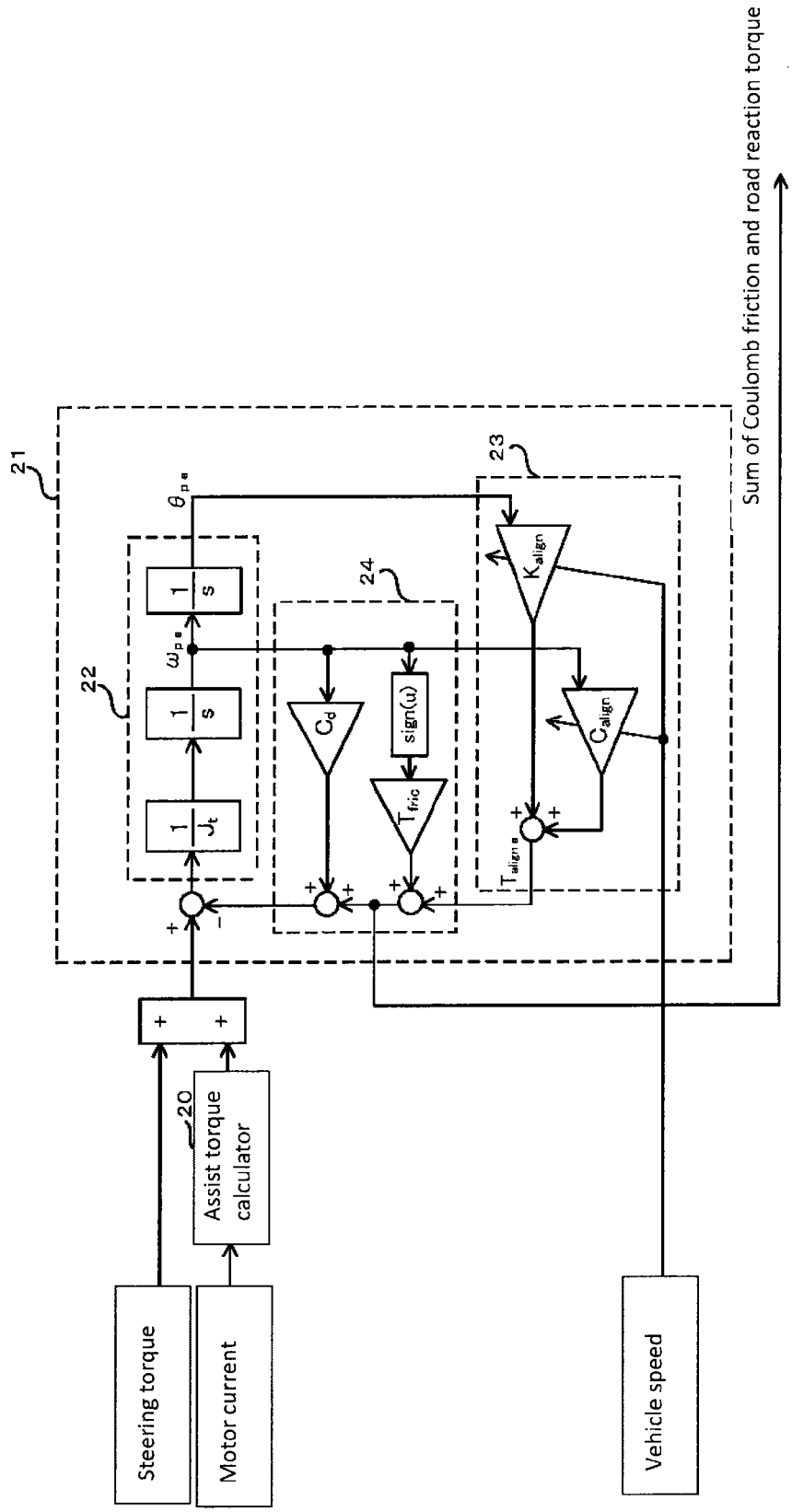
FIG. 10 is a block diagram illustrating an estimator for a sum of Coulomb friction and road reaction torque, 88, according to Embodiment 3 of the present invention.

Operations of the Coulomb friction and road reaction torque sum estimator 88, and the friction eliminator 89, which are chief parts of the invention, will be described. FIG. 10 shows a block diagram illustrating the operation of the Coulomb friction and road reaction torque sum estimator 88. The Coulomb friction and road reaction torque sum estimator 88 uses the same dynamic model as the dynamic model calculator 21 of Embodiment 2, but is configured to output the sum of Coulomb friction and road reaction torque.

As is the case with Japanese Unexamined Patent Application Publication No. 2003-312521, the friction eliminator 89 determines the time constant of the low-pass filter from the vehicle speed signal and the rotation angular velocity signal of the steering shaft 2, and the Coulomb friction and road reaction torque sum is filtered through the low-pass filter for the determined time constant, thereby eliminating the Coulomb friction and thus estimating the road reaction torque.

Because the variation of Coulomb friction is phase advanced as compared with that of the road reaction torque, the variation of the Coulomb friction and road reaction torque sum can be regarded as phase advanced in comparison with that of only the road reaction torque. Thus, only the Coulomb friction content can be eliminated using the low-pass filter of the friction eliminator 89, therefore not permitting any delay in phase of the road reaction torque estimated by the low-pass filter of the eliminator 89. Consequently, even when steering is performed in the pattern that contains much high steering frequency content, such as sharp steering, the road reaction torque can be estimated accurately.

When there are great irregularities in gear teeth of the decelerator 5, a problem has been that a torque variation caused by the gear teeth irregularities remains in the estimated value of the road reaction torque and thereby the estimated value of the road reaction torque varies. In this configuration, however, a cut-off frequency of the low-pass filter can be set lower than an oscillation frequency of the torque variation due to the gear teeth irregularities. For this reason, both Coulomb friction and torque variation due to the gear teeth irregularities can be eliminated, allowing a highly accurate estimation of the road reaction torque. Note that when vehicle speed and steering velocity are limited to certain values, the time constant of the low-pass filter can be determined to be a constant value.

Note further that the rotation angular velocity of the steering shaft 2 may be calculated from the motor current and voltage, and alternatively from a rotation angle sensor attached to the steering wheel 1, the motor 6, or the steering shaft 2. Here, when the rotation angular velocity of the steering shaft 2 is calculated from the motor current and voltage to determine the time constant of the low-pass filter of the friction eliminator 89, the motor voltage does not need to be differentiated mathematically, so that the influence of noise on the motor voltage is small and negligible.

In terms of the friction of the steering shaft, the viscous friction, and the Coulomb friction, of the steering shaft are considered, which represent friction caused by rotation of the steering shaft and contain resistance such as friction caused by the movement of the rack 10, and by the decelerator 5 and the motor 6. In this case, small friction that has a small amount of influence on estimation accuracy of the road reaction torque can be neglected.

Embodiment 4

As is the case with Embodiment 2, the present embodiment is directed to the typical electric power steering system in which there exists the Coulomb friction acting on the steering shaft 2. Of the components in the present embodiment, components that are common to those in Embodiment 2 described above are designated by the same names, reference numerals and symbols. The differences will be chiefly described below.

Figure 11:
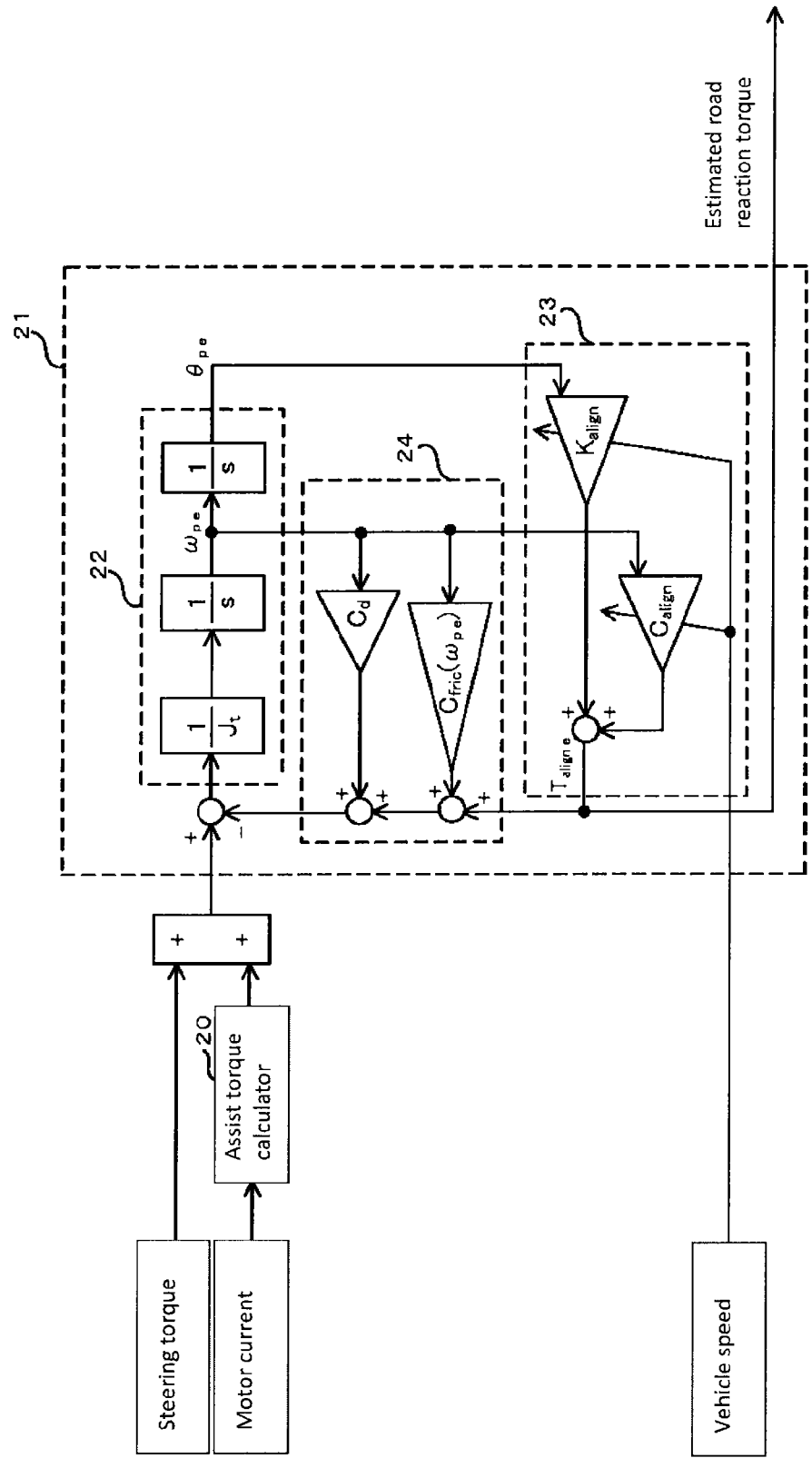
FIG. 11 is a block diagram illustrating an operation of a road reaction torque estimator 82 according to Embodiment 4 of the present invention.

The present embodiment is different from Embodiment 2 in the configuration of the road reaction torque estimator 82 shown in FIG. 2, which is the block diagram of the control unit 8. Operation of the road reaction torque estimator 82 will be described with reference to the block diagram shown in FIG. 11.

By the use of the viscosity coefficient $C_{fric}(\omega_{p\_e})$ that is variable to the estimated value $\omega_{p\_e}$ of rotation angular velocity of the steering shaft 2, the Coulomb friction of the friction model calculator 24 is represented as the product of $C_{fric}(\omega_{p\_e})$ and $\omega_{p\_e}$. Values of $C_{fric}(\omega_{p\_e})$ corresponding to various values of $\omega_{p\_e}$, are pre-stored in a memory, and a value of $C_{fric}(\omega_{p\_e})$ is set from its corresponding value of $\omega_{p\_e}$. $C_{fric}(\omega_{p\_e})$ is set to decrease as $\omega_{p\_e}$ increases, whereby the Coulomb friction is expressed.

Figure 12:
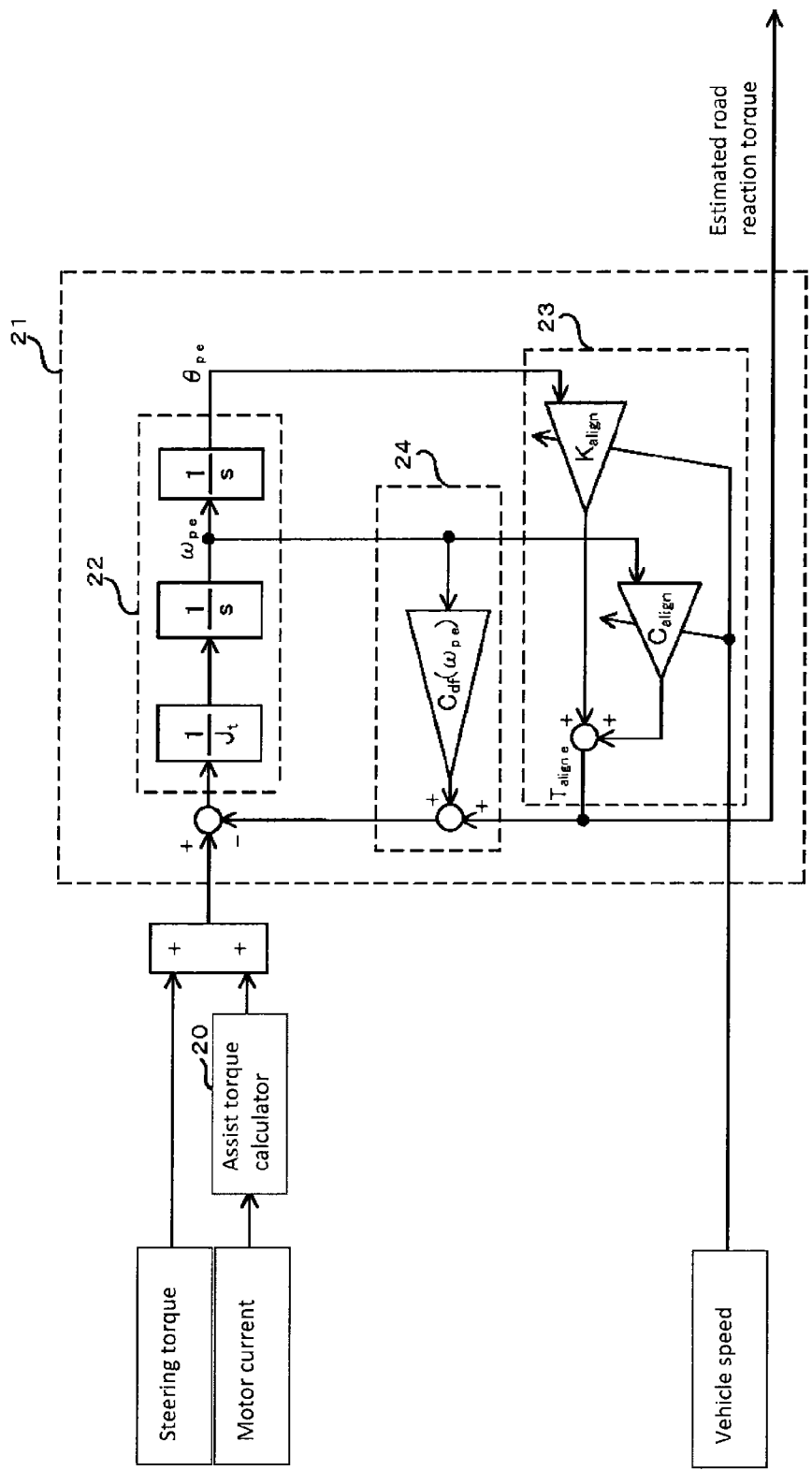
FIG. 12 is another block diagram illustrating the operation of the road reaction torque estimator 82 according to Embodiment 4 of the present invention.

Here, the friction model calculator 24 may be expressed using the viscosity coefficient $C_{df}(\omega_{p\_e})$ that is variable to the estimated value $\omega_{p\_e}$ of the rotation angular velocity of the steering shaft 2, in place of the viscosity coefficient $C_d$ and the variable viscosity coefficient $C_{fric}(\omega_{p\_e})$ of the steering shaft 2, as shown in the block diagram of FIG. 12.

With the above configuration, even when Coulomb friction acts on the steering shaft 2, the road reaction torque in which the influences of motor inertia torque and Coulomb friction are eliminated can accurately be estimated without detecting any motor rotation angular information and rotation angular velocity information. Also when steering is performed in the pattern that contains much high steering frequency content, such as sharp steering, the road reaction torque can be estimated accurately.

Further, the friction model calculator may be configured such that since the variable viscosity coefficient is assigned as $C_{fric}(\omega_p)$ or $C_{df}(\omega_p)$ and their values corresponding to the rotation angular velocity $\omega_p$ of the steering shaft 2 are pre-stored in a memory, $C_{fric}(\omega_p)$ or $C_{df}(\omega_p)$ is determined from $\omega_p$. Also in this case, the road reaction torque in which the influences of motor inertia torque and Coulomb friction are eliminated can be estimated accurately.

Here, even when, in Embodiment 3, the friction model calculator 24 is expressed by the variable viscosity coefficient, the road reaction torque in which the influences of the motor inertia torque and the Coulomb friction are eliminated can be estimated accurately.

Embodiment 5

As is the case with Embodiment 2, the present embodiment is directed to the typical electric power steering system in which the Coulomb friction acts on the steering axis 2. Of the components in the present embodiment, components that are common to those in Embodiment 2 described above are designated by the same names, reference numerals and symbols. The differences will be chiefly described below.

Figure 13:
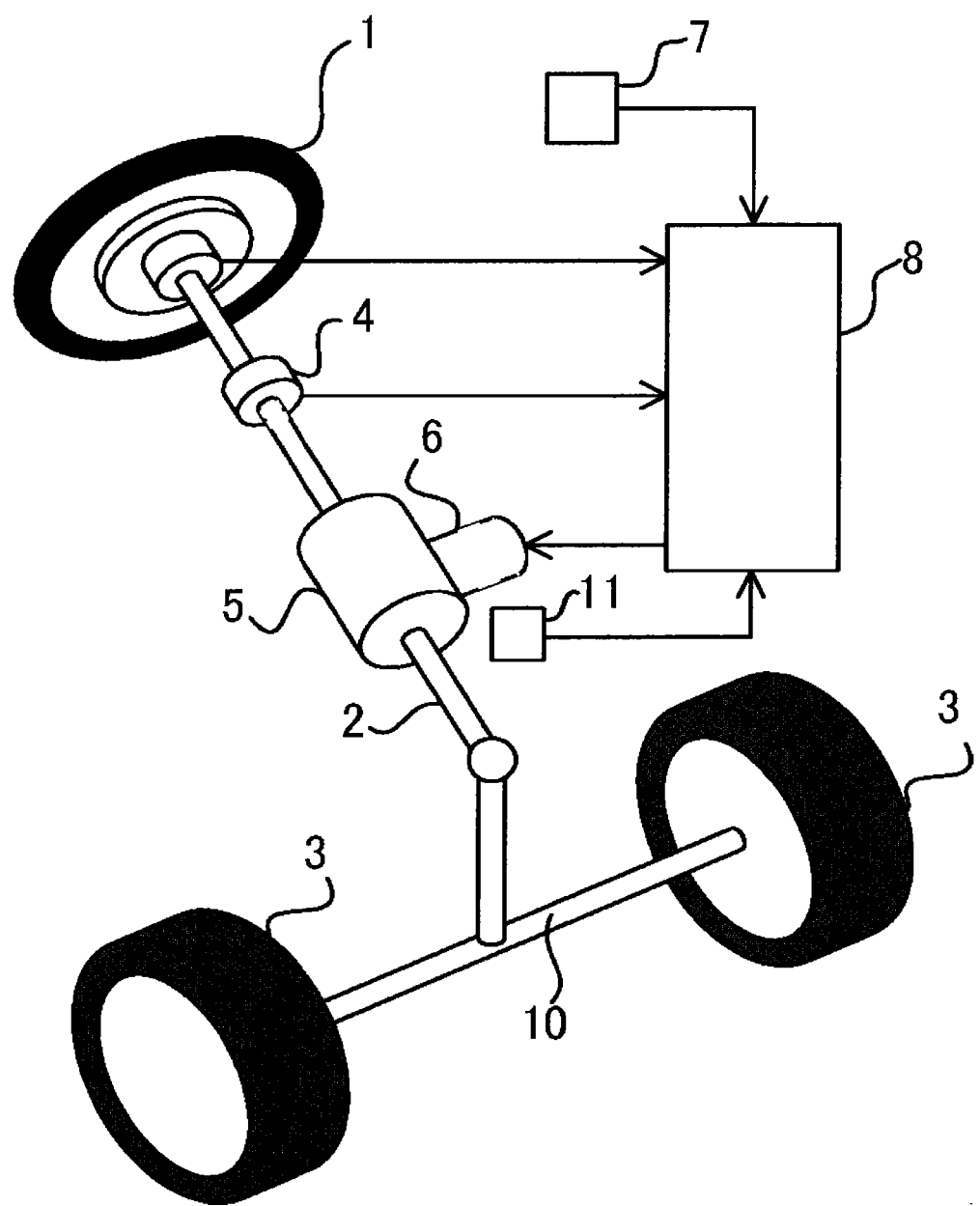
FIG. 13 is a diagrammatic view illustrating a configuration of an electric power steering system according to Embodiment 5 of the present invention.
Figure 14:
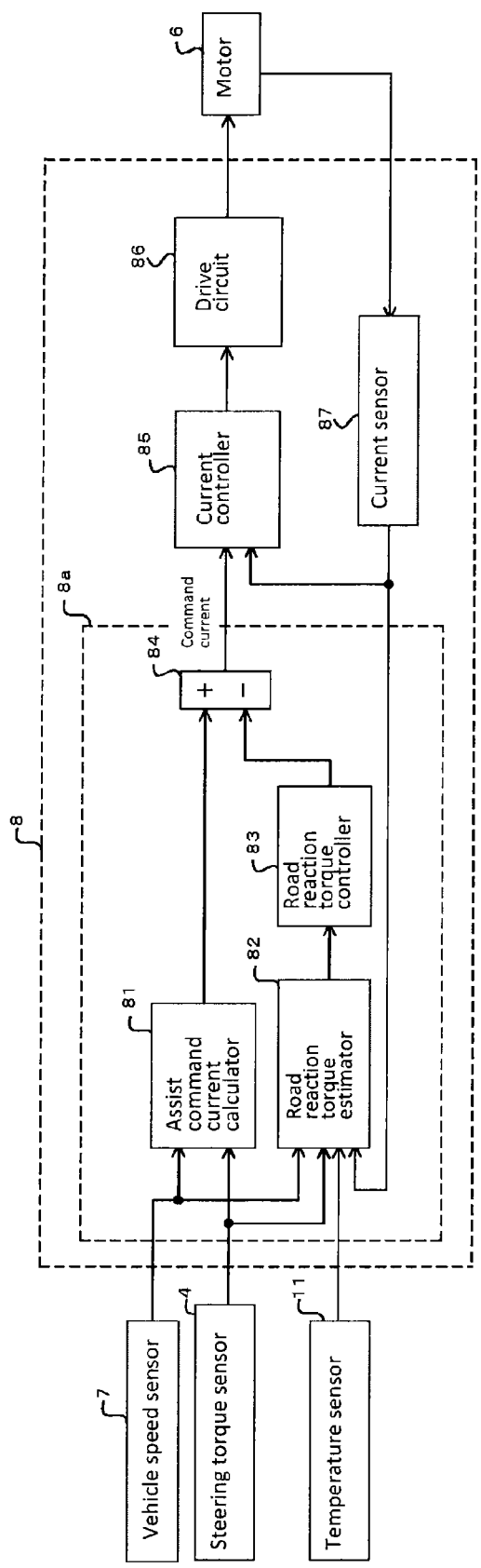
FIG. 14 is a block diagram illustrating a control unit 8 according to Embodiment 5 of the present invention.
Figure 15:
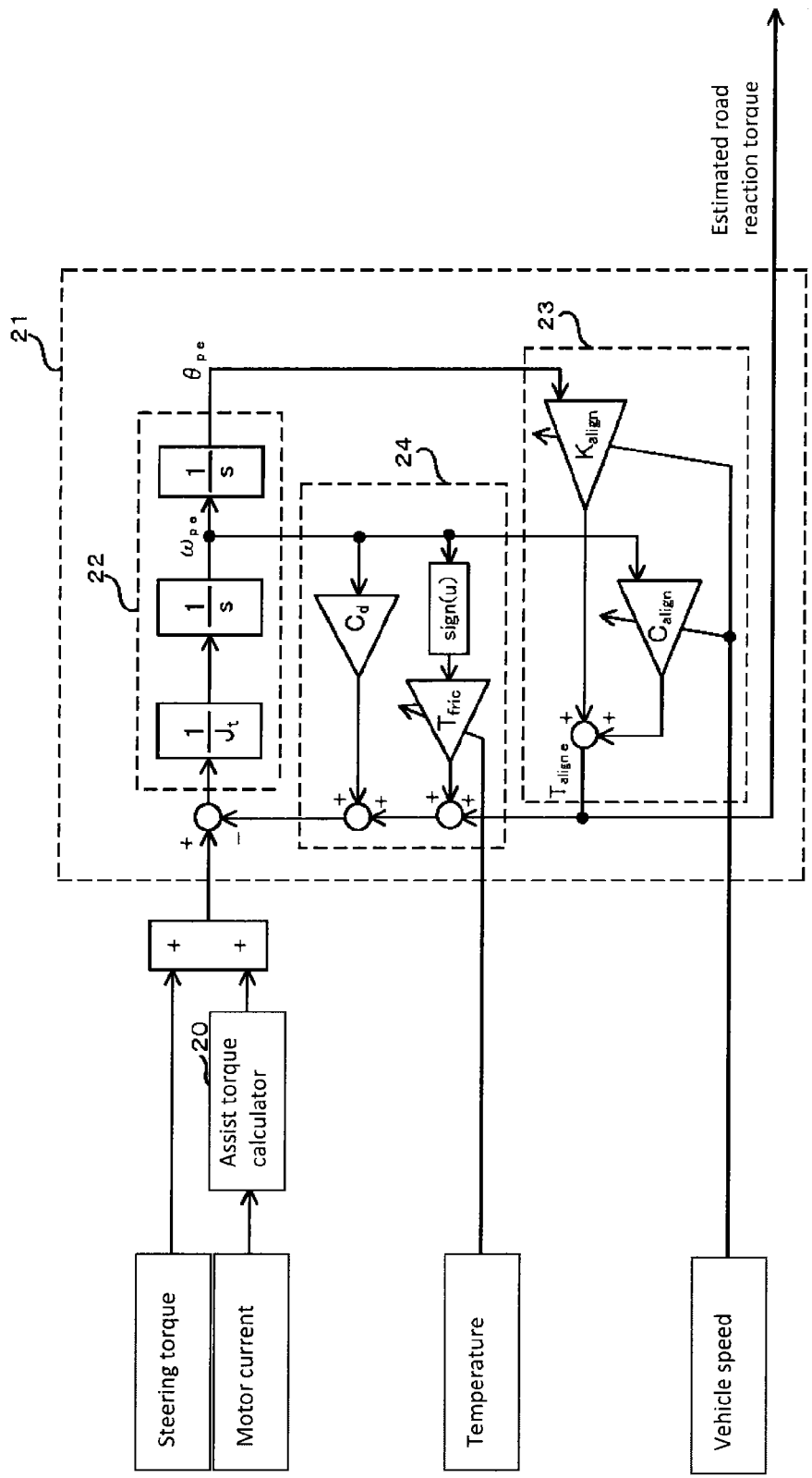
FIG. 15 is a block diagram illustrating an operation of a road reaction torque estimator 82 according to Embodiment 5 of the present invention.

FIG. 13 is a diagrammatic view illustrating a configuration of an electric power steering system according to Embodiment 5 of the invention. In Embodiment 5 of the invention, a temperature sensor 11 is included that detects a temperature in the neighborhood of the steering shaft 2, as shown in FIG. 13. FIG. 14 is a block diagram of the control unit 8 according to Embodiment 5 of the invention. Referring to FIG. 14, the output from the temperature sensor 11 is received by the road reaction estimator 82. Operation of the road reaction estimator 82 will be described with reference to the block diagram shown in FIG. 15.

The friction model calculator 24 is configured such that the amplitude $T_{fric}$ of the Coulomb friction of the friction model calculator 24 is variable according to a temperature measured with the temperature sensor 11. In other words, values of $T_{fric}$ corresponding to various temperatures are pre-stored in a memory, and from a temperature measured with the temperature sensor 11, its corresponding value of $T_{fric}$ is determined.

With the above configuration, even when the temperature changes and the amplitude of Coulomb friction changes, the road reaction torque in which the influences of motor inertia torque and Coulomb friction are eliminated can accurately be estimated without detecting any motor rotation angular information and rotation angular velocity information.

Further, in Embodiment 1 through Embodiment 5, not only the Coulomb friction but also the viscosity coefficients $C_d$, $C_{fric}(\omega_{p\_e})$, and $C_{df}(\omega_{p\_e})$ of the steering shaft 2, and $K_{align}$ and $C_{align}$ of the vehicle model calculator 23 may be determined based on temperatures. The road reaction torque estimator 82 can thereby be configured properly even when the temperature changes and various physical parameters of the vehicle vary, and thus, the road reaction torque in which the influences of the motor inertia torque and the Coulomb friction are eliminated can be estimated accurately.

REFERENCE NUMERALS

- 1 steering wheel
- 2 steering shaft
- 3 steerable road wheels
- 4 steering torque sensor
- 5 decelerator
- 6 motor
- 7 vehicle speed sensor
- 8 control unit
- 9. rotation angular velocity sensor
- 10 rack
- 8a command current calculator
- 21 dynamic model calculator
- 22 steering shaft dynamic model calculator
- 23 vehicle model calculator
- 24 friction model calculator
- 81 assist command current calculator
- 82 road reaction torque estimator
- 83 road reaction torque controller
- 84 subtractor
- 85 current controller
- 86 drive circuit
- 87 current sensor
- 88 estimator for sum of Coulomb friction and road reaction torque
- 89 friction eliminator
- 11 temperature sensor

The invention claimed is:
1. An electric power steering system comprising:
a steering torque detector that detects steering torque;
a motor that provides an assist torque based on the detected steering torque and a road reaction torque; and
a command current calculator configured to calculate a value corresponding to a rotation velocity of a steering shaft based on the detected steering torque and the assist torque, and to calculate the road reaction torque based on the value corresponding to the rotation velocity of the steering shaft.

2. The electric power steering system of claim 1, wherein the command current calculator is further configured to calculate a rotation angle of the steering shaft based on the value corresponding to the rotation velocity of the steering shaft, and to calculate the road reaction torque based on the rotation angle.

3. The electric power steering system of claim 1, further comprising a vehicle speed detector that detects vehicle travel speed, wherein the value corresponding to the rotation velocity of the steering shaft is calculated based on the steering torque, the assist torque, and vehicle speed detected by the vehicle speed detector, to calculate the road reaction torque based on the value corresponding thereto.

4. The electric power steering system of claim 1, wherein the command current calculator is further configured to calculate friction of the steering shaft based on the value corresponding to the rotation velocity of the steering shaft, and to calculate the road reaction torque based on the friction.

5. The electric power steering system of claim 2, wherein the command current calculator is further configured to calculate friction of the steering shaft based on the value corresponding to the rotation velocity of the steering shaft, and to calculate the road reaction torque based on the friction.

6. The electric power steering system of claim 4, wherein the command current calculator is further configured to calculate a viscous coefficient of the steering shaft based on any one or more of the value corresponding to the rotation velocity of the steering shaft, a rotation angular velocity signal of the steering shaft, and a temperature in a neighborhood of the steering shaft, and to calculate the friction of the steering shaft based on the viscous coefficient.

7. The electric power steering system of claim 5, wherein the command current calculator is further configured to calculate a viscous coefficient of the steering shaft based on any one or more of the value corresponding to the rotation velocity of the steering shaft, a rotation angular velocity signal of the steering shaft, and a temperature in a neighborhood of the steering shaft, and to calculate the friction of the steering shaft based on the viscous coefficient.

8. The electric power steering system of claim 4, wherein the command current calculator is configured to filter the road reaction torque, inclusive of the friction, through a low-pass filter, and to calculate a value of the road reaction torque.

9. The electric power steering system of claim 5, wherein the command current calculator is configured to filter the road reaction torque, inclusive of the friction, through a low-pass filter, and to calculate a value of the road reaction torque.

10. The electric power steering system of claim 1, further comprising a corrector configured to correct the assist torque according to the road reaction torque.

11. The electric power steering system of claim 2, further comprising a corrector configured to correct the assist torque according to the road reaction torque.

12. The electric power steering system of claim 3, further comprising a corrector configured to correct the assist torque according to the road reaction torque.

13. The electric power steering system of claim 4, further comprising a corrector configured to correct the assist torque according to the road reaction torque.

14. The electric power steering system of claim 5, further comprising a corrector configured to correct the assist torque according to the road reaction torque.

15. The electric power steering system of claim 6, further comprising a corrector configured to correct the assist torque according to the road reaction torque.

16. The electric power steering system of claim 7, further comprising a corrector configured to correct the assist torque according to the road reaction torque.

17. The electric power steering system of claim 8, further comprising a corrector configured to correct the assist torque according to the road reaction torque.

18. The electric power steering system of claim 9, further comprising a corrector configured to correct the assist torque according to the road reaction torque.

* * * * *